United States Patent [19]

Cole

[11] Patent Number: 5,049,002

[45] Date of Patent: Sep. 17, 1991

[54] METHOD FOR CLEANING OIL SPILLS

[76] Inventor: Pamela R. Cole, 3707 N. Cherry, Kansas City, Mo. 64116

[21] Appl. No.: 544,989

[22] Filed: Jun. 28, 1990

[51] Int. Cl.$^5$ .......................... C09K 3/32; C02F 1/40; E02B 15/04
[52] U.S. Cl. .................................. 405/128; 210/691; 210/708; 210/925
[58] Field of Search ............... 210/671, 691, 730, 737, 210/773, 708, 925; 405/128, 129

[56] References Cited

U.S. PATENT DOCUMENTS

| | | | |
|---|---|---|---|
| 3,676,357 | 7/1972 | Ciuti et al. | 210/691 X |
| 4,160,729 | 7/1979 | Wilcox | 210/691 |
| 4,178,265 | 12/1979 | Matsuda et al. | 210/925 X |
| 4,469,603 | 9/1984 | Lepain et al. | 210/925 X |
| 4,477,286 | 10/1984 | Rossmann et al. | 210/708 X |

FOREIGN PATENT DOCUMENTS

| | | | |
|---|---|---|---|
| 70307 | 5/1980 | Japan | 210/691 |
| 2033368 | 5/1980 | United Kingdom | 210/691 |

Primary Examiner—Dennis L. Taylor
Assistant Examiner—John Ricci
Attorney, Agent, or Firm—Kokjer, Kircher, Bradley, Wharton, Bowman & Johnson

[57] ABSTRACT

A method for removing crude oil, or other oil products, from an aqueous environment is provided. A lipid composition is melted and applied to an aqueous medium containing oil. The melted lipid composition initially mingles with the oil and later cools to form a solidifed mass. When the solidified mass is removed, a substantial portion of the oil initially present in the aqueous medium is also removed. The lipid composition comprises at least 65 percent lipid component, by total weight of composition, and at least 35 percent, by weight, of the lipid component is saturated fatty acids. Preferably, the lipid composition is selected from the group consisting of dairy butter, shortening, and mixtures thereof.

17 Claims, No Drawings

METHOD FOR CLEANING OIL SPILLS

BACKGROUND OF THE INVENTION

The present invention is directed toward providing a method for removing spilled crude oil, or other oil products, from the open environment. More particularly, this invention relates to the use of a biodegradable substance having a strong affinity for oil to efficiently remove crude oil from an aqueous medium.

Crude oil, and other derivative oil products, can cause severe environmental damage when spilled into the open environment. Because of the environmental danger, comprehensive means for removing the oil are necessary to remedy the mishap and prevent further environmental degradation. This is a problematic and expensive task, which is further frustrated by the fact that oil spills are unexpected events requiring immediate action and readily available supplies. Spill disasters occur under a variety of circumstances, and efficient methods for clean-up are often learned as the operations proceed. Several techniques have been found to have utility in a variety of circumstances. However, the usefulness of these methods, and combinations thereof, varies depending upon the location and size of the spill, as well as the environmental conditions present at that time.

Many oil spills occur in navigable waters and several clean-up methods have been developed to remove oil from aqueous environments, which include the use of fire, dispersants, mechanical booms and skimmers, and absorbent materials. The least environmentally damaging method of clean-up is supplied by mother nature in the form of microorganisms that metabolize oil on land and in the water. These organisms are not generally concentrated in a spill area to the extent needed for fast and comprehensive cleanup.

Although spills into navigable waters are hazardous to wildlife, and a general threat to healthy ecosystems, there is even greater environmental concern when oil reaches delicate coastal areas, shellfish beds, or land areas which provide habitat for wildlife. Therefore, preventing the spread of spilled oil over a larger expanse of water or onto adjacent land areas is a primary objective in most clean-up operations.

Burning or the use of dispersants is often first looked to as a clean-up method when a spill is large and has not spread into coastal regions. Burning does have utility in ridding the aqueous region of the oil quickly, thereby preventing further spread of the oil to more delicate areas. However, the more volatile components of crude oil evaporate quickly so that large quantities of a wicking agent are needed to keep the oil aflame. Burning has limited success in cold environments, because the water temperature removes heat faster than combustion can be supported. Although burning can prevent environmental damage by removing oil from the aqueous environment, the amount of resulting air pollution diminishes its overall utility.

The use of dispersants is a more recent method for cleaning up oil spills, which is predominantly considered in the initial stages of clean-up procedures to prevent spreading of oil into more delicate areas. Dispersants penetrate an oil slick and form an oil in water emulsion, so that the oil is dispersed into small droplets throughout a larger volume of water. The oil is not actually removed from the water. Instead, the increased oil surface area permits much more evaporation and microbial activity so that the oil will presumably disappear in time. Dispersants are often used when a spill exists in outlying water areas. They have limited utility when the oil has spread near coastal regions, because freshly dispersed oil washes ashore and contaminates land areas. There is a strong environmental objection to the use of dispersants, because dispersants are primarily composed of solvents that are toxic to marine life.

Another method for preventing the spread of oil is the use of mechanical booms which are physical barriers that confine oil within boom perimeters. Booms have limited success, however, because the trapped oil often passes below the boom in the presence of large waves or strong currents. When booms are used to prevent spreading, then skimmers which mechanically pump or scoop oil out of the water are often used to remove the confined oil. These two methods work well in combination to prevent spreading and to remove oil. Both have limited utility where a spill is large, because the boom barriers cannot confine a vast area and because the skimmers are slow and work best in areas where the oil layer is thick.

When there is a large spill, either thinly spread or near coastline regions, absorbent materials can be used as a method of removal. The absorbant material soaks up the oil and is later removed from the water, so that the oil absorbed is also removed. There are both natural absorbent materials including peat moss or straw and synthetic absorbents such as polyurethane. The natural materials are inert and biodegradable so they can be used in more delicate areas, whereas the synthetic materials have more buoyancy and affinity for oil so that more oil is removed. There is one very big problem with absorbents. It is the disposal of the oil soaked absorbent materials. Transporting the materials from the spill sight to proper disposal areas can be costly, and there is environmental concern over the use of incineration or other disposal methods to destroy the materials. Although recycling has found some success, particularly for synthetics, the problem is a big one.

When coastline land areas are affected, there has been some success with cleanup by using hot water and/or scrubbing. Hot water is applied under high pressure to "blast" the oil off shoreline rocks. The oil is diluted by the hot water running off into adjacent waters and is then removed by aqueous removal techniques. Scrubbing the shoreline rocks with absorbent materials is another choice and experimentation with microbial activity has proven somewhat successful. Due to the environmental sensitivity of these areas and costs associated with attempted clean-up, it is important to have additional methods that do not create further environmental risk but which also confine and remove oil in an efficient and comprehensive fashion.

OBJECTIVES AND SUMMARY OF THE INVENTION

The present invention is directed toward solving some of the problems associated with the above mentioned methods, and also to act as another alternative either alone or in conjunction with other techniques to aid in spill disasters.

It is a primary object of this invention to provide an efficient method for removing spilled oil from an aquatic environment.

It is a further object of this invention to provide a method for removing spilled oil from an aquatic environment without incidental environmental harm.

It is yet a further object of this invention to provide a method for removing spilled oil from an aquatic environment that will also confine or prevent spreading to unaffected water or shoreline.

It is still a further object of this invention to provide a method for removing spilled oil from an aquatic environment that does not create a waste disposal problem.

It is a further object of this invention to provide a method for removing spilled oil from a aquatic environment that is safe for the workers who practice this method.

It is still a further object of this invention to provide a method for removing spilled oil from an aquatic environment that has ease of application.

It is yet a further object of this invention to provide a method for removing spilled oil from an aquatic environment which utilizes biodegradable materials.

It is also an object of this invention to provide a method for removing spilled oil from an aquatic environment that requires easily accessible tools to practice the method.

Other and further objects of the invention, together with the features of novelty appurtenant thereto, will appear in the course of the following description.

In summary, this invention involves the use of a lipid composition having a strong affinity for oil to efficiently remove crude oil or other oil products from an aqueous medium. I have discovered that a lipid composition comprising at least 65 percent lipid component, by weight total composition, where at least 35 percent of the lipid component is saturated fatty acids, will mingle with petroleum oil present in an aqueous medium when the lipid composition is melted. As the lipid composition cools to solidification temperatures, a solidified mass forms in the aqueous medium. When the solidified mass is removed, a substantial amount of the oil initially present in the aqueous medium is also removed.

DETAILED DESCRIPTION OF THE INVENTION

Unless otherwise stated herein, indication of parts or percentages are given on a weight basis.

I have discovered that a lipid composition comprising 65 to 100 percent lipid component, of the total composition, can be used to efficiently remove oil from an aqueous medium. The lipid component should contain at least 35 percent saturated fatty acids, and preferably 45 to 95 percent of the lipid component is saturated fatty acids. Although the mechanism by which this invention works is not clearly known, a lipid composition comprising less saturated fats does not properly solidify as required by this method. Preferably, the lipid composition will contain 0 to 25 percent water, and 0 to 10 percent dairy proteins selected from the group consisting of albumin and casein. Most preferably, the lipid composition is selected from the group consisting of dairy butter, shortening, and mixtures thereof.

The best mode known in practicing the invention is to use dairy butter as the lipid composition. Dairy butter is a water in oil emulsion which comprises: 75-90 percent lipid, 10-20 percent water, and 1-3 percent protein of the total composition. Trace amounts of vitamins and minerals are also present. About 65 percent of the lipid component in butter is saturated fatty acids. These fatty acids include: butyric, caproic, caprylic, capric, lauric, myristic, palmitic, and stearic. About 35 percent of the lipid component in butter is unsaturated fatty acids such as palmitoleic, oleic, linoleic, and linolenic acids. The proteins, albumin and casein are present in dairy butter and although the actual mechanism and reason that the use of butter proves highly effective is unknown, it is noted that albumin and casein are known to thicken or harden with heating.

The lipid composition should be melted to liquid and further heated to a temperature that will allow slow cooling to solidification temperatures when exposed to the aqueous medium and external air temperature. I have discovered that when the lipid composition is not heated to a temperature high enough to prevent immediate or quick solidification in the aqueous medium, then the lipid composition mingles with less oil and the amount of oil subsequently removed with the solidified mass is less than where the lipid composition slowly cools to solidification temperatures.

The temperature at which the lipid composition should be heated to will vary depending upon the temperature of the aqueous medium in which the oil is present, as well as external air temperatures. This temperature can range anywhere from 100° to 350° F., but experiments tend to show that higher temperature melts work to eliminate a higher quantity of oil.

The melted lipid composition may be applied to the surface of the oil spill by any means available such as pouring or spraying the composition onto the aqueous medium containing the oil. The amount of lipid composition applied is proportionately related to the oil present in the water. The lipid to oil ratio may fall in the range from 0.5/1.0 to 1.0/1.0.

Following the application of lipid composition to the aqueous medium, the lipid composition should be allowed to cool to solidification temperatures until a solidified mass is formed in the aqueous medium. Complete solidification will take anywhere from 30 minutes to 2 hours and it is important that removal attempts are not made until the mass is completely solidified. The solidified mass can then be removed by any available means, including mechanical devices used to scoop the floating mass out of water.

A second application of the heated lipid composition may be required to remove substantially all of the oil in that area.

The invention is further illustrated by the following examples:

EXAMPLE NO. 1

Each of the following oils were used in a separate test: 10W40 car oil, 50W chain oil, 90W lube oil, and crude oil. One teaspoon of oil was poured into a 4½ oz. container holding water. The water temperature was 59° F. One-half teaspoon of dairy butter was melted and further heated to a temperature of 100° F. The melted butter was then poured over the oil in water.

The butter and oil initially mingle by swirling, followed by the formation of three distinct layers floating on the water. Approximately 35 minutes later, the three layers solidified forming a solid mass floating on top of the water. The solidified mass was removed by manually scooping it out of the water with a hand held strainer. Approximately ¾ of the oil initially placed in the water was removed.

EXAMPLE NO. 2

The same process as Example No. 1 except that the water temperature was 34° F. and the dairy butter temperature remained at 100° F.

The oil and butter did formed a thinner three layer mass, which solidified quickly. ½ of the oil initially in water was removed.

EXAMPLE NO. 3

The same process as Example No. 1 except that the water temperature was 69° F. and the dairy butter was heated to 160° F.

The layers did not solidify until 1 hour after applying the dairy butter. Upon removing the soft/solid form, approximately ⅞ of the oil was removed from the water.

EXAMPLE NO. 4

The same process as Example No. 1 except that the water temperature was 34° F. and the dairy butter was heated to 160° F.

The layers solidified after 45 minutes and upon removing the solid form, approximately ⅝ of the oil was removed from the water.

EXAMPLE NO. 5

The same process as Example No. 1 except that the water temperature was 34° F. and the melted butter was 300° F.

The solidified mass was removed 45 minutes later and approximately ⅞ of the oil was removed from the water.

EXAMPLE NO. 6

The same process as Example No. 1, except that a shortening comprising 100 percent lipid component, where about 40 percent of the lipid component is saturated fatty acids and about 60 percent of the lipid component is unsaturated fatty acids was used instead of dairy butter. This shortening is known as a vegetable oil and animal fat shortening. The shortening used for this set of examples was CRISCO.

After the melted shortening was added, it took about 30 minutes to form a distinctly layered mass and the mass never became as solid or hard as those made with dairy butter. Because the mass was softer and more pliable, it was more difficult to remove as one large section. About ½ of the oil initially in the water was removed.

From the foregoing it will be seen that this invention is one well adapted to attain all end and objects hereinabove set forth together with the other advantages which are obvious and which are inherent to the structure.

It will be understood that certain features an subcombinations are of utility and may be employed without reference to other features and subcombinations. This is contemplated by and is within the scope of the claims.

Since many possible embodiments may be made of the invention without departing from the scope thereof, it is to be understood that all material herein set forth or shown in the accompanying examples is to be interpreted as illustrative and not in a limiting sense.

Having thus described the invention, I claim:

1. A method for removing oil from an aqueous medium comprising:
   melting a lipid composition comprising at least 65 percent lipids, by weight of the total composition, heating said lipid composition to a temperature of at least 100° F.;
   applying said melted lipid composition to an aqueous medium containing oil;
   allowing said lipid composition to cool to solidification temperatures whereby a solidified mass forms in said aqueous medium; and
   separating said solidified mass from said aqueous medium.

2. A method as described in claim 1 wherein said lipids comprise at least 35 percent saturated fatty acids, by weight total lipids.

3. A method as described in claim 2 wherein said lipid composition is selected from the group consisting of dairy butter, shortening, and combinations thereof.

4. A method as described in claim 2 wherein said lipid composition comprises 0 to 15 percent water, by total weight of said lipid composition.

5. A method as described by claim 4 wherein said lipid composition is a water in oil emulsion.

6. A method as described in claim 2 wherein said lipid composition comprises 0 to 10 percent dairy protein selected from the group consisting of albumin, casein, and combinations thereof.

7. A method as described by claim 1 wherein said lipid composition is heated to a temperature ranging from 100°–350° F.

8. A method as described in claim 1 wherein said melted lipid composition is applied to the aqueous medium in the range from .5/1 to 1/1 by volume ratio lipid to oil.

9. A method as described by claim 1 wherein said oil is selected from the group consisting of crude oil, crude oil derivative products, and combinations thereof.

10. A method as described by claim 1 wherein said melted lipid composition is applied by pouring or spraying said lipid composition onto said aqueous medium containing oil.

11. A method as described by claim whereby said solidified mass is separated from said aqueous medium by removing said mass with a scooper or strainer.

12. A method for removing oil from an aqueous medium comprising:
    melting a lipid composition wherein said lipid composition comprises by total weight: 75 to 95 percent lipid, 0 to 25 percent water and 0 to 10 percent dairy proteins selected from the group consisting of albumin, casein, and combinations thereof;
    heating said lipid composition to a temperature in the range of 100 to 350 F.;
    applying said melted lipid composition to an aqueous medium containing oil in a .5/1 to 1/1 by volume ratio of lipid composition to oil;
    allowing said lipid composition to cool to solidification temperatures whereby a solidified mass forms in said aqueous medium; and
    separating said solidified mass from said aqueous medium.

13. A method as described by claim 12 wherein said lipids comprise 45 to 95 percent saturated fatty acids by weight lipids.

14. A method as described in claim 13 wherein said lipid composition is a water in oil emulsion.

15. A method as described by claim 13 wherein said melted lipid composition is selected from the group consisting of: butter.

16. A method as described in claim 12 wherein said melted lipid composition is applied by pouring or spraying said lipid composition onto said aqueous medium containing said oil.

17. A method as described by claim 12 wherein said solidified mass is separated from said aqueous medium by removing said mass with a scooper or strainer.

* * * * *